(12) United States Patent
Park

(10) Patent No.: US 12,549,116 B2
(45) Date of Patent: Feb. 10, 2026

(54) DEVICE AND METHOD FOR CONTROLLING INVERTER, AND STEERING SYSTEM

(71) Applicant: HL MANDO CORPORATION, Gyeonggi-do (KR)

(72) Inventor: Jaesang Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 225 days.

(21) Appl. No.: 18/381,952

(22) Filed: Oct. 19, 2023

(65) Prior Publication Data
US 2024/0136957 A1 Apr. 25, 2024
US 2024/0235434 A9 Jul. 11, 2024

(30) Foreign Application Priority Data

Oct. 20, 2022 (KR) .......... 10-2022-0136041

(51) Int. Cl.
*H02P 6/12* (2006.01)
*B62D 5/04* (2006.01)
*H02P 3/18* (2006.01)
*H02P 27/06* (2006.01)

(52) U.S. Cl.
CPC .............. *H02P 3/18* (2013.01); *B62D 5/0484* (2013.01); *B62D 5/0487* (2013.01); *H02P 27/06* (2013.01)

(58) Field of Classification Search
CPC .......... H02P 3/18; H02P 27/06; H02P 29/024; H02P 29/028; H02M 7/53871; H02M 1/32; H02M 1/325; H02M 7/48
See application file for complete search history.

(56) References Cited

U.S. PATENT DOCUMENTS

2017/0331399 A1* 11/2017 Yamane .................. H02P 6/06
2020/0398890 A1* 12/2020 Bouchet .............. B62D 5/0487

FOREIGN PATENT DOCUMENTS

JP 2007-331683 12/2007
JP 2010-68689 3/2010

OTHER PUBLICATIONS

Office Action dated May 23, 2025 for Korean Patent Application No. 10-2022-0136041 and its English translation provided by Applicant's foreign counsel.

* cited by examiner

*Primary Examiner* — Muhammad S Islam
(74) *Attorney, Agent, or Firm* — WOMBLE BOND DICKINSON (US) LLP

(57) ABSTRACT

There may provide a device and method for controlling an inverter, and a steering system using the same. The device for controlling the inverter may include a failure determiner configured to determine, in response to an occurrence of a failure in an inverter circuit connected to a motor, whether the failure corresponds to a predetermined failure type based on a braking torque of the motor, and a controller configured to control, if the failure corresponds to the failure type, a switching operation of the inverter circuit so as to reduce the braking torque of the motor based on the failure type.

17 Claims, 10 Drawing Sheets

DEVICE AND METHOD FOR CONTROLLING INVERTER, AND STEERING SYSTEM

CROSS REFERENCE TO RELATED APPLICATION

This application claims priority from Korean Patent Application No. 10-2022-0136041, filed on Oct. 20, 2022, which is hereby incorporated by reference for all purposes as if fully set forth herein.

TECHNICAL FIELD

An embodiment of the present disclosure relates to a device and a method for controlling an inverter, and a steering system with the same.

BACKGROUND

For the past few years, the number of vehicles equipped with steering systems using three-phase inverters and permanent magnet motors (PMSM) has continued to increase. In recent years, such vehicles have come to account for the largest percentage of total automobile sales. Motors using permanent magnets can easily achieve large output torque through inverters and controllers. In addition, as precise control of motors becomes possible with the development of microprocessors and an integrated circuit (IC) devices, the spread of motors using permanent magnets is rapidly increasing not only in automobiles but also in industry. The spread of these motors is accelerating due to various advantages such as control performance and package aspects, but there are problems in terms of price and resistance in the event of failure.

In particular, in the case of a permanent magnet motor (PMSM), when rotational force is input from the outside, it does not operate as a motor that generates rotational force through input from the battery, but may operate as a generator that generates voltage by external rotational force. A permanent magnet synchronous generator (PMSG), which uses the regenerative braking power of these motors, is mainly used in wind power generators. However, in the case of a vehicle's motor, if regenerative braking force is generated, the vehicle's battery may be charged or the vehicle's braking force can be improved. However, if it operates similarly to the motor's regenerative braking due to an unintended situation or failure, there may be a problem in that motor braking torque is generated.

Therefore, in the case that a failure of an inverter occurs, there is a need for inverter control technology capable of reducing the braking torque of the motor caused by the failure.

SUMMARY

According to the present embodiments, there may provide an inverter control device and method capable of reducing the braking torque of the motor caused by the failure in the case of a failure of an inverter, and a steering system using the same.

In accordance with an aspect of the present disclosure, there is provided a device for controlling an inverter including a failure determiner configured to determine, in response to an occurrence of a failure in an inverter circuit connected to a motor, whether the failure corresponds to a failure type based on a braking torque of the motor, and a controller configured to control, if the failure corresponds to the failure type, a switching operation of the inverter circuit so as to reduce the braking torque of the motor based on the failure type.

In accordance with another aspect of the present disclosure, there is provided a method for controlling an inverter including determining, in response to an occurrence of a failure in an inverter circuit connected to a motor, whether the failure corresponds to a failure type based on a braking torque of the motor, and controlling, if the failure corresponds to the failure type, a switching operation of the inverter circuit so as to reduce the braking torque of the motor based on the failure type.

In accordance with another aspect of the present disclosure, there is provided a steering system including a steering motor for assisting a steering device, and a steering control module configured to control the steering motor, wherein the steering control module comprises a failure determiner configured to determine, in response to an occurrence of a failure in an inverter circuit connected to the steering motor, whether the failure corresponds to a failure type based on a braking torque of the steering motor, and a controller configured to control, if the failure corresponds to the failure type, a switching operation of the inverter circuit so as to reduce the braking torque of the steering motor based on the failure type.

According to embodiments, it is possible to provide an inverter control device and method capable of reducing the braking torque of the motor caused by the failure in the case of a failure of an inverter, and a steering system using the same.

DETAILED DESCRIPTION

Figure 1:
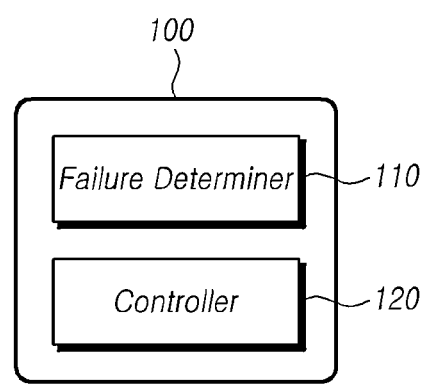
FIG. 1 illustrates a configuration of an inverter control device according to an embodiment of the present disclosure.

The present disclosure relates to an inverter control device and method.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A Motor in this specification may be classified into brushless direct-current motors (BLDCM) and permanent magnet synchronous motors (PMSM, BLAC) depending on the control method of back electromotive force and armature current. For example, permanent magnet synchronous motors may be BLDC, which has a trapezoidal waveform back electromotive force and applies a square wave current to the flat part of the back electromotive force, and/or a permanent magnet synchronous motor (PMSM), which has a sinusoidal waveform back electromotive force and applies a sinusoidal current. The motor in this specification is described as a PMSM as an example, but is not limited thereto.

An inverter in this specification may be a three-phase inverter, and may be configured using six semiconductor power switching elements such as an insulated gate bipolar transistor (IGBT), metal oxide semiconductor field effect transistor (MOSFET), junction transistor (BJT), and gate turn-off thyristor (GTO), and the switching elements are not limited to a specific type. In addition, the three-phase inverter may supply sinusoidal current by adjusting the turn on-turn off time of six semiconductor power switching elements and applying the voltage of a sinusoidal wave modulated into a square wave to the motor. Such a three-phase inverter may include a detection circuit for detecting short-circuit current generated by a failure of a semiconductor power switching element.

FIG. 1 illustrates a configuration of an inverter control device according to an embodiment of the present disclosure.

Referring to FIG. 1, an inverter control device 100 according to an embodiment of the present disclosure may be configured to include a failure determiner 110 and a controller 120. For example, the inverter control device 100 may include the failure determiner 110 configured to determine, in response to an occurrence of a failure in an inverter circuit connected to a motor, whether the failure corresponds to a preset failure type based on a braking torque of the motor, and a controller 120 configured to control, if the failure corresponds to the failure type, a switching operation of the inverter circuit so as to reduce the braking torque of the motor based on the failure type.

The failure determiner 110 of the inverter control device 100 according to an embodiment may determine whether a failure occurring in an inverter circuit corresponds to a preset failure type. For example, if a failure occurs in the inverter circuit connected to a motor, the failure determiner 110 may determine whether the failure corresponds to a preset failure type based on the braking torque of the motor. For example, in the case of a failure of the inverter circuit, the failure determiner 110 may compare the braking torque according to a speed of the motor and set the failure type in advance. The failure type may be preset to a failure due to a short circuit in the switching element of the inverter circuit or a failure due to a short circuit in a DC-link. Specifically, the failure determiner 110 may determine that a failure is a preset failure type if the failure is a failure due to a short circuit in one or both of the upper and lower switching elements of the inverter circuit. Alternatively, the failure determiner 110 may determine that a failure is a preset failure type if the failure is due to a DC-link short circuit in the inverter circuit.

If the failure corresponds to a preset failure type, the controller 120 of the inverter control device 100 according to an embodiment may control a switching operation of the inverter circuit to reduce the braking torque of the motor based on the failure type. For example, if the failure corresponds to a preset failure type, the controller 120 may control the switching operation of the inverter to be in a three-phase short-circuit state based on the speed of the motor according to the failure type. Accordingly, the controller 120 may be easily formed to a control phase and may switch to a three-phase short-circuited state with less ripple generation compared to other failure types. For example, if the occurred failure corresponds to a failure type caused by a short circuit in the switching element, the controller 120 may control the switching operation of the inverter to enter a three-phase short-circuit state if the speed of the motor is higher than a preset first speed. Here, the first speed may be preset at a speed at which the braking torque due to a three-phase short circuit is smaller than the braking torque due to each switching element short circuit. In addition, if the failure corresponds to a failure type due to a DC-link short circuit, the controller 120 may control the switching operation of the inverter to enter a three-phase short-circuit state if the speed of the motor is higher than a preset second speed. Here, the second speed may be preset at a speed at which the braking torque due to a three-phase short-circuit is smaller than the braking torque due to a DC-link short circuit.

For another example, if a preset failure type occurs, the controller 120 may control the switching operation so as for an upper switching element or the lower switching element for each phase of the inverter circuit to be turned-on simultaneously based on the speed of the motor. Additionally, the controller 120 may control the switching operation so that the remaining switching elements located on the same side as the short-circuited switching element are simultaneously turned on based on the short-circuited switching element. Specifically, if one switching element is short-circuited, the controller 120 may control the switching operation so that the remaining two switching elements located on the same side as the short-circuited switching element are turned on at the same time. Additionally, if there are two short-circuited switching elements and are connected to the same side, the controller 120 may control the switching operation so that the remaining switching element located on the same side is turned on. Alternatively, if there are two short-circuited switching elements and each is connected to the other side, the controller 120 may control the switching operation by selecting one of the upper side or lower side and simultaneously turning on the remaining two switching elements located at selected one side.

Therefore, in the case that a failure of the inverter circuit occurs, the controller 120 of the inverter control device 100 according to one embodiment may compare the braking torque according to the speed of the motor, and may be controlled to forcibly switch to another failure type with a lower motor braking torque according to the preset failure type. Accordingly, the inverter control device 100 may control the entire system without modifying an ECU circuit in the event of a failure.

Figure 2:
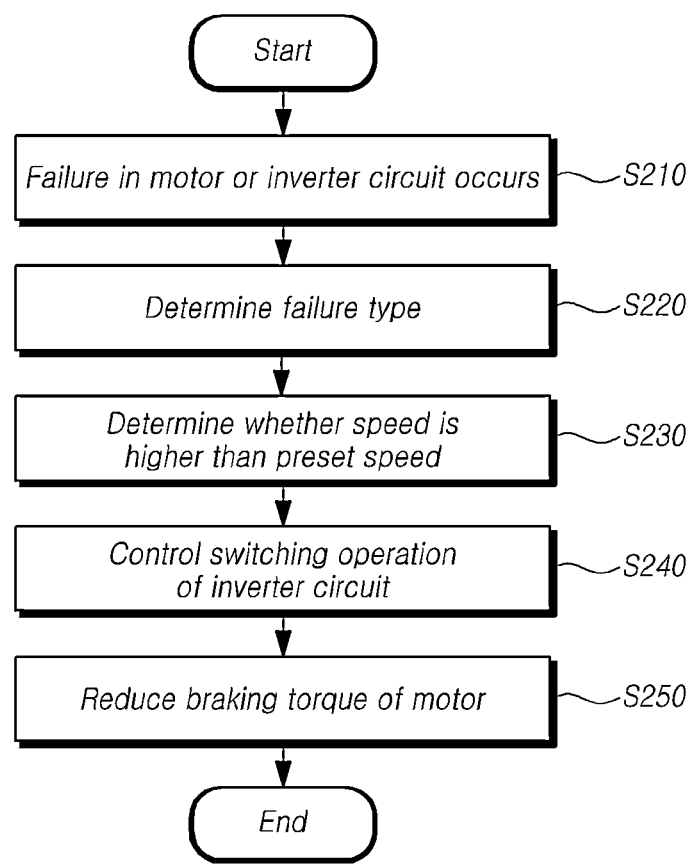
FIG. 2 is a flowchart for explaining the operation of the configuration of an inverter control device according to an embodiment of the present disclosure.

FIG. 2 is a flowchart for explaining the operation of the configuration of an inverter control device according to an embodiment of the present disclosure.

Referring to FIG. 2, there is described an example of the operation of the inverter control device 100 according to an embodiment of the present disclosure to control the switching operation of the inverter circuit based on the braking torque of the motor. As an example, the failure determiner 110 of the inverter control device 100 may detect the occurrence of a failure in the motor or inverter circuit (S210). For example, the inverter control device 100 may be configured with an analog-to-digital converter (ADC) that detects a detection current detected from at least one current sensor installed in the inverter circuit. Additionally, the inverter control device 100 may connect an analog-to-digital converter to an input terminal and compare the detection current with a preset reference current to detect the occurrence of a failure in a motor or inverter. That is, if a switching element is short-circuited, the failure determiner 110 of the inverter control device 100 may determine that the short-circuited switching element corresponds to one of a switching element connected to a positive voltage side and a switching element connected to the negative voltage side of the direct current power supply based on the detection current.

As an example, the failure determiner 110 of the inverter control device 100 may determine whether the detected failure of the motor or inverter circuit corresponds to a preset failure type (S220). For example, the failure determiner 110 of the inverter control device 100 may determine whether the occurred failure corresponds to a preset failure type based on the braking torque of the motor. That is, the failure determiner 110 of the inverter control device 100 may determine whether the occurred failure corresponds to a failure type capable of being forcibly converted to a failure type with low braking torque. Here, the preset failure type may be a failure (e.g., FET Single short, FET Double short) due to a short circuit in the switching element of the inverter circuit or a failure due to a DC-link short circuit. Additionally, the preset failure type may be a failure due to a short circuit in the windings of the motor.

As an example, if an occurred failure corresponds to a specific failure type, the controller 120 of the inverter control device 100 may determine whether a speed of the motor is higher than a preset speed (S230). For example, if the occurred failure corresponds to a specific failure type, the controller 120 of the inverter control device 100 may determine whether the speed of the motor is higher than a preset speed according to each failure type. Here, the preset speed may be set using the braking torque of the motor according to the specifications and failure type of the motor. Specifically, below a specific speed of the motor, the braking torque in case of a failure due to a short-circuit in one switching element is less than the braking torque in a three-phase short-circuit state, which can be advantageous. On the other hand, above a specific speed, the braking torque of the motor in a three-phase short-circuit state is smaller than the braking torque in the case of a failure due to a short-circuit of one switching element, which can be advantageous. In addition, a three-phase short-circuit state can be advantageous since it is easy to form a controlled phase and generates less ripple compared to other failure types.

As an example, the controller 120 of the inverter control device 100 may control the switching operation of the inverter circuit based on the speed of the motor (S240). For example, if the speed of the motor is higher than a preset speed, the controller 120 of the inverter control device 100 may control the switching operation to turn on one or two remaining switching elements located on the same side as the short-circuited switching element at the same time. That is, the controller 120 of the inverter control device 100 may control the switching operation to enter a three-phase short-circuit state in the case that the speed of the motor is higher than a preset speed. Specifically, the three-phase short-circuit state may be a state in which a motor coil of each phase is short-circuited by turning on all the upper switching elements of the inverter circuit and turning off all the lower switching elements of the inverter circuit. Alternatively, the three-phase short-circuited state may be a state in which each phase motor coil is short-circuited by turning on all lower switching elements of the inverter circuit and turning off all upper switching elements of the inverter circuit.

As an example, the inverter control device 100 may reduce the braking torque of the motor (S250). For example, the inverter control device 100 may reduce the braking torque of the motor by forcibly switching to another failure type, such as a three-phase short-circuit state.

Figure 3:
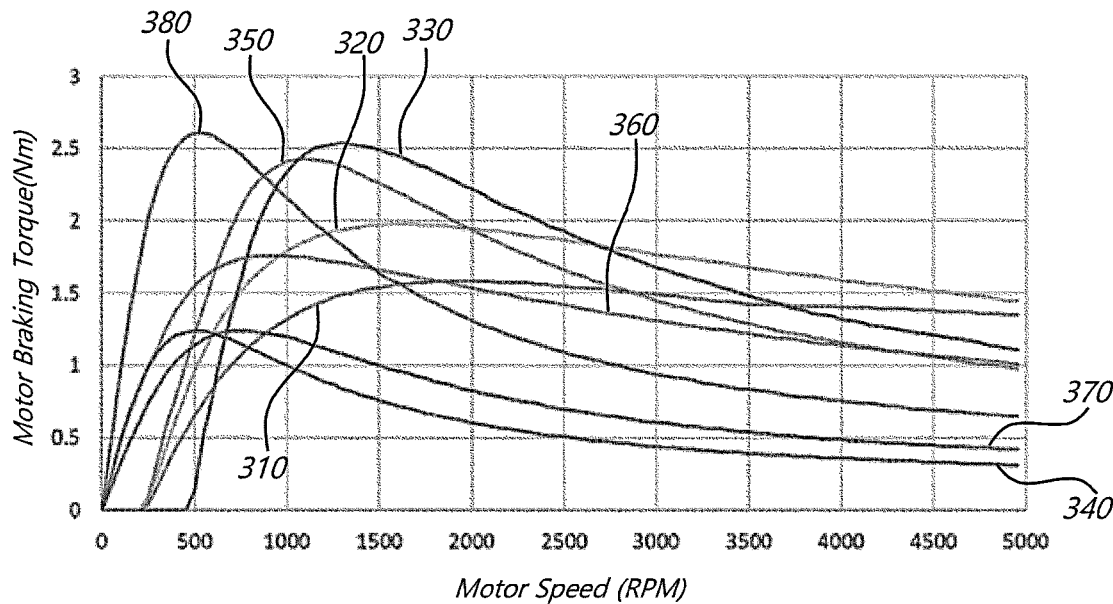
FIG. 3 is a diagram for explaining a braking torque of a motor according to a failure type according to an embodiment of the present disclosure.

FIG. 3 is a diagram for explaining a braking torque of a motor according to a failure type according to an embodiment of the present disclosure.

Referring to FIG. 3, there is described the braking torque of the motor according to the failure type of the inverter circuit connected to the motor according to an embodiment of the present disclosure. As an example, failures that may occur in an inverter circuit may be classified into power-side failures including rectifiers, load-side failures, sensor failures, DC-link capacitor short-circuit, switching elements open, switching elements short-circuited, and motor winding short-circuit. For example, even if the specifications of the motor and the inverter circuit are the same, the braking torque of the motor may be different depending on the type of failure occurred in the inverter circuit. Here, the braking torque of the motor may be generated by regenerative current flowing according to the rotor phase of the motor since the short-circuited switching element is always turned on.

Accordingly, the inverter control device may reduce the driver's load by controlling the forced switching to another failure type with a lower braking torque than the occurred failure type.

Here, as shown in the figure, the failure type may include one of a failure 310 due to a single short circuit of the switching element, a failure 320 due to a double short of the switching elements located on a different leg, a failure 330 due to a DC-link short, a failure 340 due to short between phases of the motor, a failure 350 due to a double short of the switching elements located on a same leg, a failure 360 due to a double short of the switching elements located on the same side, a failure 370 due to a short between a phase of the motor and a neutral point, and a failure 380 due to a three-phases short-circuit of the motor.

Specifically, comparing the braking torque of the motor, the failure 380 due to a three-phases short-circuit of the motor may generate a large braking torque in all speed sections compared to the failure 340 due to short between phases of the motor and the failure 370 due to a short between a phase of the motor and the neutral point. Alternatively, compared to the failure 310 due to a single short circuit of the switching element, the failure 320 due to a double short of the switching elements located on a different leg, the failure 330 due to the DC-link short, the failure 350 due to a double short of the switching elements located on a same leg, and a failure 360 due to a double short of the switching elements located on the same side, the failure 380 due to a three-phases short-circuit of the motor may generate a larger braking torque below a specific speed, but may generate a smaller braking torque above a specific speed.

Therefore, the inverter control device according to an embodiment of the present disclosure may operate more effectively in the case of the failures 310, 320, 350 and 360 due to a short circuit in one or two switching elements or the failure 330 due to the DC-link short circuit.

FIGS. 4 to 7 are diagrams for explaining a method of reducing braking torque according to a failure type according to the present embodiments.

Referring to FIGS. 4 to 7, in an inverter circuit according to the present embodiments, an upper switching element 410 connected to a positive voltage side of the direct current power supply (VDC) and a lower switching element 420 connected to a negative voltage side of the direct current power supply are connected in series respectively, and three series circuits may be connected in parallel. In addition, each connection point of the upper switching element 410 connected to the positive voltage side and the lower switching element 420 connected to the negative voltage side of the DC power supply may be connected to each of the three-phase output terminals U, V and W of the motor 400, respectively.

In this case, a resistor may be connected between each connection point of the upper switching element 410 connected to the positive voltage side and the lower switching element 420 connected to the negative voltage side of the DC power supply and each of the three-phase output terminals U, V and W of the motor 400. The resistor may be a shunt resistor for detecting current.

Here, each switching element may have a first terminal connected to the positive voltage side, a second terminal connected to the negative voltage side, and a gate terminal. Accordingly, the inverter control device 100 may be connected to the gate terminal of each switching element, and may control the switching operation so that the switching element is turned on and off by charging the gate of the power switching semiconductor (e.g., MOSFET, IGBT).

Figure 4:
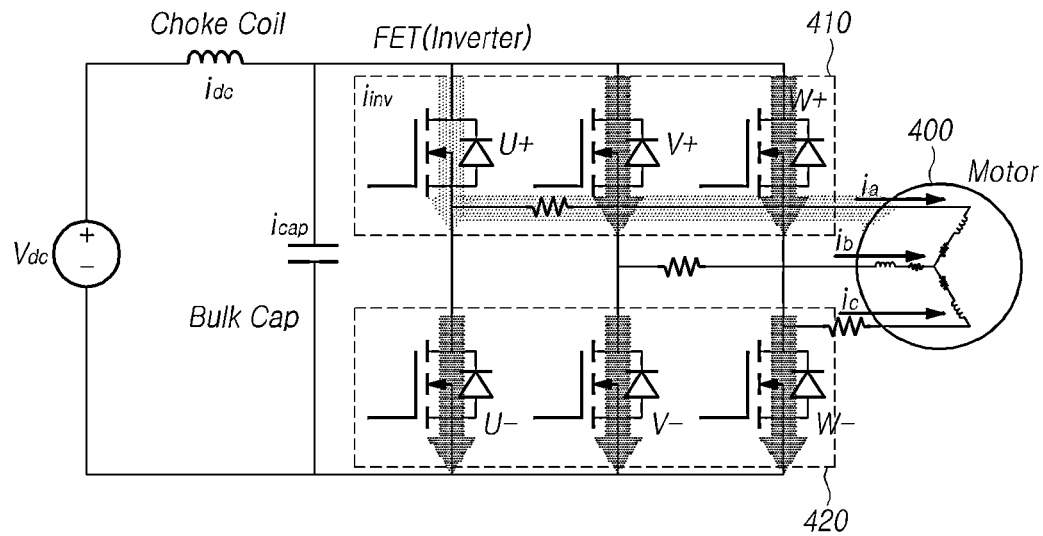
FIG. 4 illustrates a case in which a failure type is a failure due to a short circuit in a switching element according to an embodiment of the present disclosure.

FIG. 4 illustrates a case in which a failure type is a failure due to a short circuit in a switching element according to an embodiment of the present disclosure.

Referring to FIG. 4, there is explained that a failure type according to an embodiment of the present disclosure is a failure due to a short circuit in a switching element of an inverter circuit. As shown in FIG. 4, a U+ switching element among the upper switching elements (410) may be shorted.

Specifically, the failure determiner 110 of the inverter control device 100 may determine whether the occurred failure corresponds to a failure due to a short circuit in a switching element of the inverter circuit among the failures of the inverter circuit. For example, the failure determiner 110 may determine whether a failure is caused by a short circuit in one or both of the upper switching element 410 and the lower switching element 420 of the inverter circuit, which is a preset failure type. Specifically, the determination of the failure due to a short circuit in the switching element may be performed by a collector-emitter voltage detection method (ICBT) or a drain-source voltage detection method (MOSFET), which are common short circuit determination methods.

In addition, as an example, if the failure occurs due to a short circuit in the switching element of the inverter circuit, the controller 120 of the inverter control device 100 may control a switching operation of the inverter to reduce the braking torque of the motor 400. For example, the failure determiner 110 may determine that, if the failure is due to a short circuit in either the upper switching element 410 or the lower switching element 420 of the inverter circuit, the failure corresponds to a preset failure type. Then, the controller 120 may control the switching operation so that one or two remaining switching elements located on the same side as the short-circuited switching element are turned on at the same time. Accordingly, if the controller 120 controls the remaining two switching elements to be turned on at the same time, there may be converted to a three-phase short-circuit state and reduce braking torque. Alternatively, if the controller 120 controls one remaining switching element to be turned on, although it is not a three-phase short-circuit state, the two switching elements may be switched to a short-circuit state so that the braking torque may be reduced.

For another example, if the failure is a failure due to a short circuit of two switching elements connected to the same side among the upper switching element 410 or the lower switching element 420 of the inverter circuit, the failure determiner 110 may determine that the failure corresponds to a preset failure type. Then, the controller 120 may control the switching operation so that one remaining switching element located on the same side as the short-circuited switching element is turned on. Accordingly, since the controller 120 controls one remaining switching element to be turned on, there may be converted to a three-phase short-circuit state and reduce braking torque.

Figure 5:
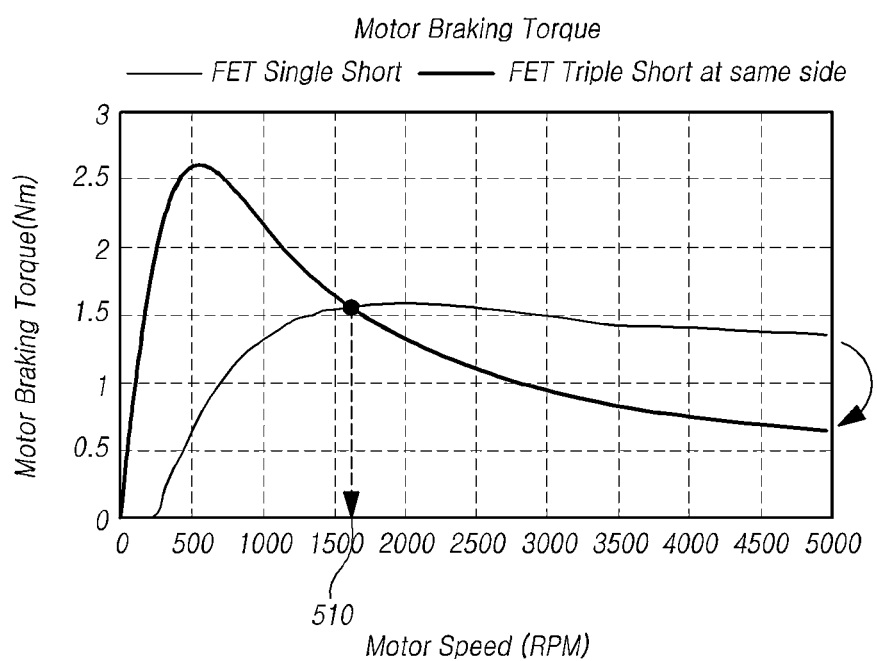
FIG. 5 illustrates a case in which an inverter control device according to an embodiment of the present disclosure reduces braking torque in the case of a failure due to a short circuit in a switching element.

FIG. 5 illustrates a case in which an inverter control device according to an embodiment of the present disclosure reduces braking torque in the case of a failure due to a short circuit in a switching element.

Referring to FIG. 5, there is described a configuration of the inverter control device according to an embodiment of the present disclosure to control the switching operations for reducing the braking torque in the case of the failure due to a short circuit of the switching element. For example, if the failure occurs due to a short circuit in the switching element, the controller 120 of the inverter control device 100 may control the switching operation of the inverter to enter a three-phase short-circuit state based on the speed of the motor. For example, in the case of the failure 340 due to a short circuit of one or two switching elements, if the speed of the motor is higher than a preset first speed 510, the controller 120 may control the switching operation of the remaining switching elements, which are not short-circuited, so as to switch to a three-phase short-circuit state. Here, the first speed 510 may be a speed at which the braking torque caused by a three-phase short-circuit is smaller than the braking torque caused by a short circuit of each switching element. Accordingly, the first speed 510 may be set based on the speed at which the braking torque decreases depending on the specifications and failure type of the motor. For example, in terms of braking torque, the short circuit of one switching element may be advantageous if the motor speed is less than 1600 rpm, but a three-phase short-circuit state may be advantageous if the motor speed is more than 1600 rpm. Accordingly, the controller 120 may preset the first speed 510 to 1600 rpm. In addition, if the failure is due to a short circuit in one switching element and the speed of the motor is 1600 rpm or more, the controller 120 may control the switching operation of the remaining switching elements located on the same side as the short-circuited switching element to switch to the three-phases short-circuit state. However, 1600 rpm is an example and is not limited thereto. That is, the controller 120 may reduce the braking torque by forcibly operating the switching element of the inverter circuit to switch to the three-phases short-circuit state.

Figure 6:
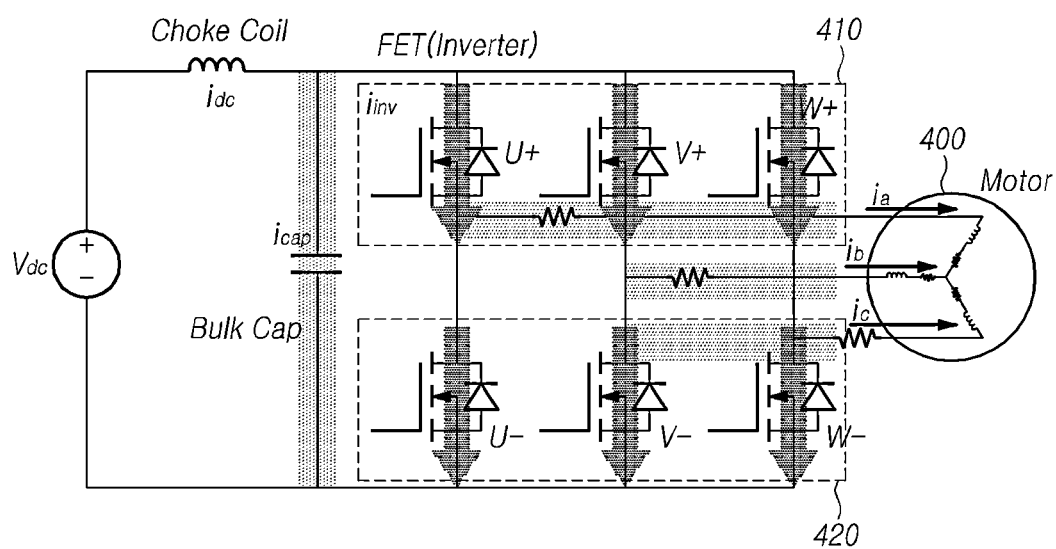
FIG. 6 is a diagram for explaining a case where the failure type is a failure due to a DC-link short circuit according to an embodiment of the present disclosure.

FIG. 6 is a diagram for explaining a case where the failure type is a failure due to a DC-link short circuit according to an embodiment of the present disclosure.

Referring to FIG. 6, there is explained that a failure type according to an embodiment of the present disclosure is a failure due to the DC lint short circuit.

Specifically, the failure determiner 110 of the inverter control device 100 may determine whether the occurred failure is due to the DC-link short circuit of the inverter circuit among the failures of the inverter circuit. For example, the failure determiner 110 may determine a failure due to the DC-link short circuit by monitoring a voltage of a DC-link capacitor using a general DC-link voltage detection circuit. For a specific example, if the voltage at both ends of the DC-link capacitor changes more than the reference potential difference during a specific time interval, the failure determiner 110 may determine that the failure is due to the DC-link short circuit.

In addition, as an example, if the occurred failure is a failure due to the DC-link short circuit of the inverter circuit, the controller 120 of the inverter control device 100 may control the switching operation of the inverter to reduce the braking torque of the motor 400. For example, if the failure is due to a short circuit in the DC link of the inverter circuit, the failure determiner 110 may determine that the failure corresponds to a preset failure type. Then, the controller 120 may control the switching operation so that the upper switching element or the lower switching element for each phase of the inverter circuit is turned on simultaneously. Accordingly, if the controller 120 controls the three upper or lower switching elements to be turned on at the same time, there may be switched to the three-phase short-circuit state, thereby reducing braking torque.

In addition, as another example, if the occurred failure is a failure due to a short circuit in the windings of the motor, the controller 120 of the inverter control device 100 may control the switching operation of the inverter to reduce the braking torque of the motor 400. For example, if the failure is due to a winding short circuit of the motor, the failure determiner 110 may determine that the failure corresponds to a preset failure type. Then, the controller 120 may control the switching operation so that the upper switching element or the lower switching element for each phase of the inverter circuit is turned on simultaneously. Accordingly, if the controller 120 controls the three upper or lower switching elements to be turned on at the same time, there may be switched to the three-phase short-circuit state, thereby reducing braking torque.

Figure 7:
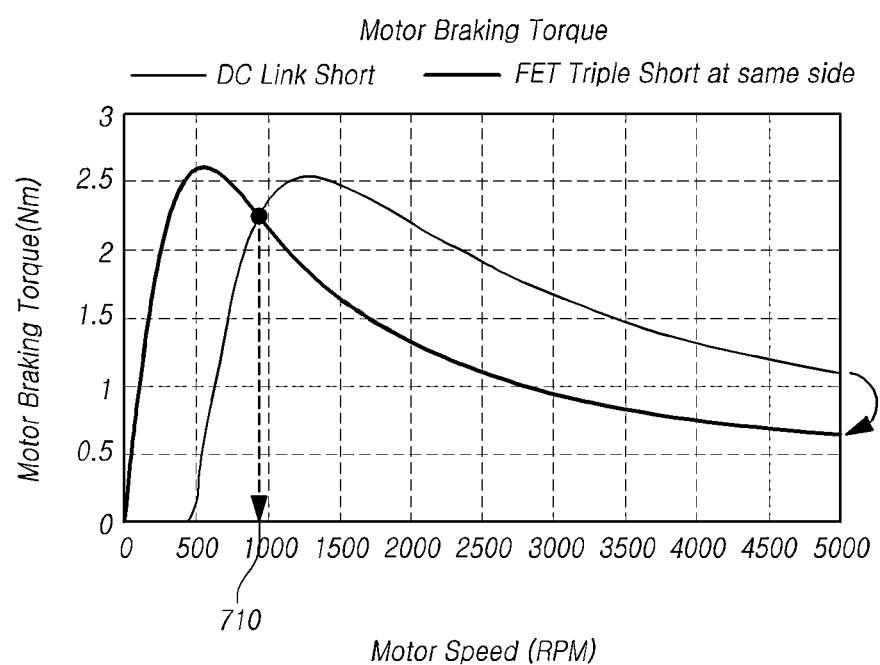
FIG. 7 illustrates a case in which an inverter control device according to an embodiment of the present disclosure reduces braking torque in the case of a failure due to the DC-link short circuit.

FIG. 7 illustrates a case in which an inverter control device according to an embodiment of the present disclosure reduces braking torque in the case of a failure due to the DC-link short circuit.

Referring to FIG. 7, there is described a configuration of the inverter control device according to an embodiment of the present disclosure to control the switching operations for reducing the braking torque in the case of the failure due to the DC-link short circuit. For example, if the failure occurs due to the DC-link short circuit, the controller 120 of the inverter control device 100 may control the switching operation of the inverter to enter a three-phase short-circuit state based on the speed of the motor. For example, in the case of the failure 350 due to the DC-link short circuit, if the speed of the motor is higher than a preset second speed 710, the controller 120 may control the switching operation of the three upper switching elements or the three lower switching elements, so as to switch to a three-phase short-circuit state. Here, the second speed 710 may be a speed at which the braking torque caused by a three-phase short-circuit is smaller than the braking torque caused by the DC-link short circuit. Accordingly, the second speed 710 may be set based on the speed at which the braking torque decreases depending on the specifications and failure type of the motor. For example, in terms of braking torque, the DC-link short circuit may be advantageous if the motor speed is less than 950 rpm, but a three-phase short-circuit state may be advantageous if the motor speed is more than 950 rpm. Accordingly, the controller 120 may preset the second speed 710 to 950 rpm. In addition, if the failure is due to the DC-link short circuit and the speed of the motor is 950 rpm or more, the controller 120 may control the switching operation of the three upper switching elements or the three lower switching elements to switch to the three-phases short-circuit state. However, 950 rpm is an example and is not limited thereto. That is, the controller 120 may reduce the braking torque by forcibly operating the switching element of the inverter circuit to switch to the three-phases short-circuit state.

Hereinafter, it will be described an inverter control method that can be performed by the inverter control device 100 described with reference to FIGS. 1 to 7.

Figure 8:
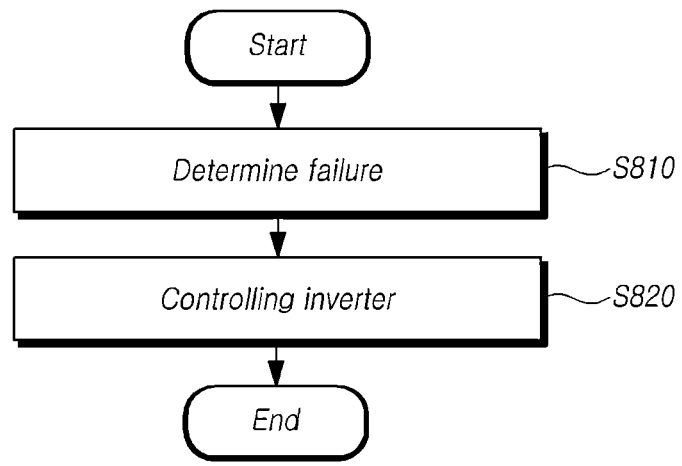
FIG. 8 is a flowchart of an inverter control method according to an embodiment of the present disclosure.

FIG. 8 is a flowchart of an inverter control method according to an embodiment of the present disclosure.

Referring to FIG. 8, the inverter control method according to an embodiment of the present disclosure may include determining a failure (S810). For example, if a failure occurs in an inverter circuit connected to a motor, the inverter control device may determine whether the occurred failure corresponds to a preset failure type based on the braking torque of the motor. For example, if a failure occurs in an inverter circuit connected to a motor, the inverter control device may determine whether the occurred failure corresponds to a preset failure type based on the braking torque of the motor. The failure type may be preset as either a failure due to a short circuit in the switching element of the inverter circuit or a failure due to a short circuit in the DC-link. Specifically, if the failure is due to a short circuit in one or both of the upper and lower switching elements of the inverter circuit, the inverter control device may determine that the failure corresponds to a preset failure type. Alternatively, if the failure is due to a short circuit in the DC link of the inverter circuit, the inverter control device may determine that the failure corresponds to a preset failure type.

Referring to FIG. 8, the inverter control method according to an embodiment of the present disclosure may include a controlling step (S820). For example, if the failure corresponds to a preset failure type, the inverter control device may control the switching operation of the inverter circuit to reduce the braking torque of the motor based on the failure type. That is, if the failure corresponds to a preset failure type, the inverter control device may control the switching operation of the inverter to enter a three-phase short-circuit state based on the speed of the motor according to the failure type. For example, if the occurred failure corresponds to a failure type due to a short circuit in the switching element, and the speed of the motor is above the preset first speed, the inverter control device may control the switching operation of the inverter to enter the three-phase short-circuit state. Here, the first speed may be preset at a speed at which the braking torque due to the three-phase short-circuit is smaller than the braking torque due to each switching element short circuit. Additionally, if the occurred failure corresponds to a failure type due to a DC-link short circuit, the inverter control device may control the switching operation of the inverter to enter the three-phase short-circuit state if the speed of the motor is higher than a preset second speed. Here, the second speed may be preset at a speed at which the braking torque due to the three-phase short-circuit is smaller than the braking torque due to the DC-link short circuit.

For another example, if the occurred failure corresponds to a preset failure type, the inverter control device may control the switching operation so that the upper switching element or the lower switching element for each phase of the inverter circuit are simultaneously turned on based on the speed of the motor. In addition, the inverter control device may control the switching operation so that the remaining switching elements located on the same side as the short-circuited switching element are simultaneously turned on based on the short-circuited switching element. That is, if a failure of the inverter circuit occurs, the inverter control device may compare the braking torque according to the speed of the motor, and may control the inverter to forcibly switch to another failure type in which the motor braking torque is lower according to the preset failure type. Accordingly, in the event of a failure, the inverter control device may provide the effect of minimizing the driver's load by reducing the braking torque of the entire system without modifying the ECU circuit.

Figure 9:
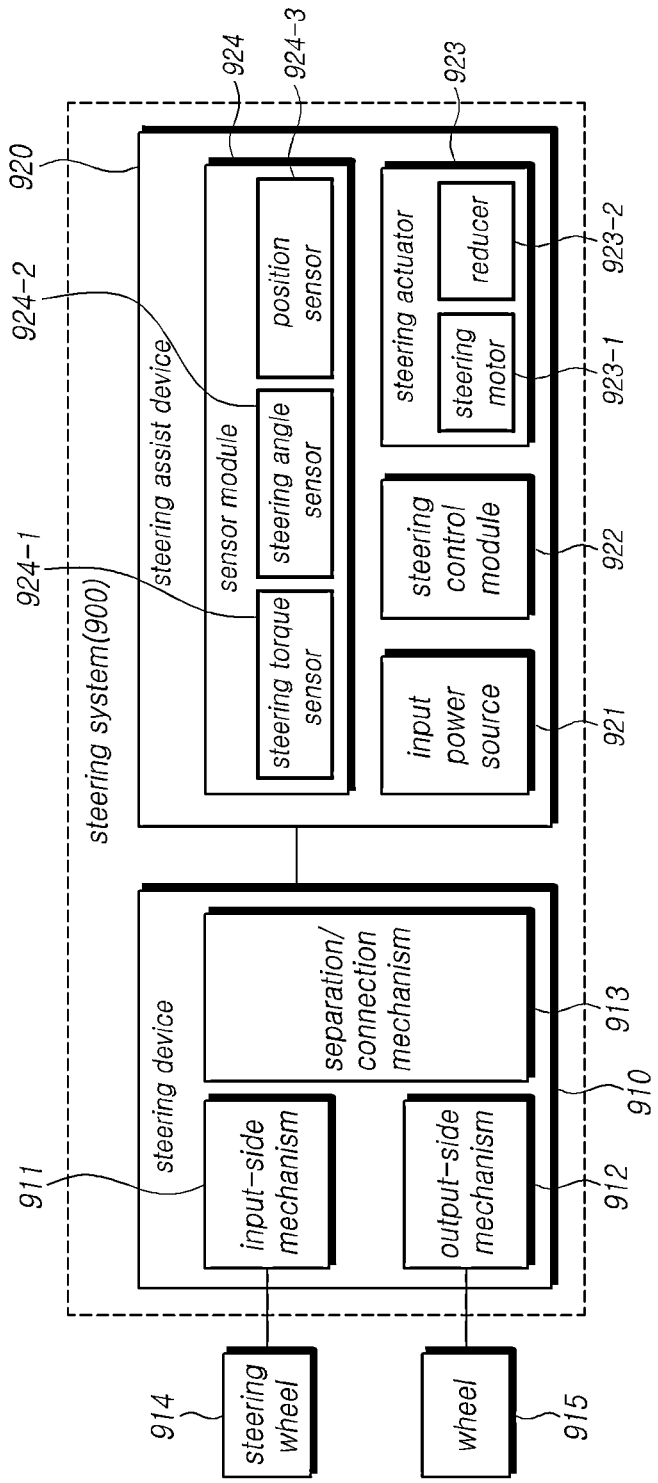
FIG. 9 is a diagram for explaining a steering system according to the present embodiments.

FIG. 9 is a diagram for explaining a steering system according to the present embodiments.

Referring to FIG. 9, the steering system 900 according to the present embodiments may include at least one of a steering device 910 and a steering assist device 920.

The steering device 910 and the steering assist device 920 may be connected by at least one of electrical manner, magnetic manner, and mechanical manner.

The steering device 910 may change a steering angle of a wheel 915 based on a steering force (or rotational force, etc.) applied to a steering wheel 914.

The steering device 910 may include at least one of an input-side mechanism 911, an output-side mechanism 912, and a separation/connection mechanism 913.

The input-side mechanism 911, the output-side mechanism 912, and the separation/connection mechanism 913 may be connected by at least one of electrical, magnetic, and mechanical means.

The input-side mechanism 911 may be connected to the steering wheel 914. The input-side mechanism 911 may rotate in the direction of rotation of the steering wheel 914 or in a direction opposite to the rotation direction of the steering wheel 914.

Here, the input-side mechanism 911 may include a steering shaft connected to the steering wheel 914, but is not limited thereto, and may include any mechanism (or device) that can rotate (or move) in the direction of rotation of the steering wheel or in a direction opposite to the direction of rotation of the steering wheel.

The output-side mechanism 912 may be connected to the input-side mechanism 911. For example, the output-side mechanism 912 may be connected to the input-side mechanism 911 by at least one of electrical and mechanical means.

The output-side mechanism 912 may be connected to the wheel 915. The output-side mechanism 912 may change the steering angle (or movement, etc.) of the wheel 915.

Here, the output-side mechanism 912 may include at least one of a universal joint, a pinion, a rack, a tie rod, and a knuckle arm, but is not limited thereto, and may include any mechanism (or device) that can change the steering angle (or movement, etc.) of the wheel.

The separation/connection mechanism 913 may be connected to the input-side mechanism 911 and the output-side mechanism 912. The separation/connection mechanism 913 may mechanically and/or electrically connect and/or separate the input-side mechanism 911 and the output-side mechanism 912.

The separation/connection mechanism 913 may include, but is not limited to, a clutch, and may include any mechanism (or device) that can mechanically and/or electrically connect and/or separate the input-side mechanism and the output-side mechanism.

Meanwhile, the steering wheel 914 may be connected to the input-side mechanism 911. The steering wheel 914 may rotate the input-side mechanism 911.

The wheel 915 may be connected to the output-side mechanism 912. The steering angle (or movement, etc.) of the wheel 915 can be changed by the output-side mechanism 912.

As shown in the drawing, the steering wheel 914 and the wheel 915 may not be included in the steering device 910, but are not limited thereto, and may be included in the steering device 910.

The steering device 910 according to the present embodiments may include a steering device in which the input-side mechanism 911 and the output-side mechanism 912 are mechanically connected; a steering device in which the input-side mechanism 911 and the output-side mechanism 912 are electrically connected (i.e., Steer-by-Wire steering device); and a steering device in which the input-side mechanism 911 and the output-side mechanism 912 are connected through the separation/connection mechanism 913 (i.e., Steer-by-Wire steering device with the clutch).

The steering assist device 920 may be connected to the steering device 910. The steering assist device 920 may assist the steering device 910.

The steering assist device 920 according to the present embodiments may be connected to at least one of the input-side mechanism 911, the output-side mechanism 912, and the separation/connection mechanism 913. The steering assist device 920 may assist and/or control at least one of the input-side mechanism 911, the output-side mechanism 912, and the separation/connection mechanism 913.

For example, the steering assist device 920 may provide assist steering force to at least one of the input-side mechanism 911 and the output-side mechanism 912. Additionally, the steering assist device 920 may control the separation/connection mechanism 913 and provide assist steering force to at least one of the input-side mechanism 911 and the output-side mechanism 912 based on the control of the separation/connection mechanism.

The steering assist device 920 may include at least one of an input power source 921, a steering control module 922, a steering actuator 923, and a sensor module 924.

The input power source 921, the steering control module 922, the steering actuator 923, and the sensor module 924 may be connected by at least one of electrical, magnetic, and mechanical means. There may be one or more input power sources 921, steering control module 922, steering actuator 923, and sensor modules 924, respectively.

The input power source 921 may include at least one of direct current power and alternating current power. Here, the direct current power source may include a battery, but is not limited thereto, and may include any power source that can provide direct current.

The steering control module 922 may control the operation of at least one of the input power source 921, the steering actuator 923, and the sensor module 924.

For example, the steering control module 922 may be connected to the input power source 921. The steering control module 922 may receive electrical energy from the input power source 921 and filter noise included in the electrical energy.

Here, electrical energy may include at least one of current, voltage, and power, but is not limited thereto, and may include any energy related to electricity.

The steering control module 922 may generate a steering motor control signal based on information provided from each component in the steering system 900 and/or the vehicle (for example, at least one of steering torque information, steering angle information, position information, and vehicle speed information, etc.).

The steering control module 920 may convert the filtered electrical energy based on the steering motor control signal to generate assist steering force, and may control the steering actuator 923 (or a steering motor 923-1) based on the assist steering force.

The steering actuator 923 may be connected to the steering control module 922. The steering actuator 923 may assist steering of the steering device 910 by operating based on the assist steering force provided from the steering control module 922.

The steering actuator 923 may include at least one of the steering motor 923-1 and a reducer 923-2, but is not limited thereto, and may include any mechanism (or device) that can assist steering of the steering device.

There may be one or more steering motors 923-1 and reducers 923-2, respectively. At least one of the steering motor 923-1 and the reducer 923-2 may be connected to the steering control module 922.

In the case that the steering actuator 923 includes the steering motor 923-1, the steering motor 923-1 may assist steering of the steering device 910 by operating based on the assist steering force provided from the steering control module 922.

In the case that the steering actuator 923 includes a steering motor 923-1 and a reducer 923-2, the steering motor 923-1 may operate based on the assist steering force provided from the steering control module 922, and the reducer 923-2 may operate based on the operation of the steering motor 923-1 to assist the steering of the steering device 910.

The steering motor 923-1 may include at least one motor of a single winding type steering motor and a dual winding type steering motor, but is not limited thereto, and may include any motor capable of assisting steering of the steering device.

The steering motor 923-1 may include at least one of a single-phase type motor, a three-phase type motor, and a five-phase type motor, but is not limited thereto, and may include any motor capable of assisting steering of the steering device.

The steering motor 923-1 may include at least one of a direct current motor and an alternating current motor (e.g., a synchronous motor and/or an induction motor, etc.), but is not limited thereto, and may include any motor capable of assisting steering of the steering device.

The sensor module 924 may include at least one sensor. Here, the sensor may include at least one of a steering torque sensor 923-1, a steering angle sensor 924-2, and a position sensor 924-3, but is not limited thereto, and may include any sensor capable of measuring the state of the vehicle and the steering state of the vehicle.

There may be one or more steering torque sensors 924-1. The steering torque sensor 924-1 may detect the steering torque of the steering wheel, obtain steering torque information of the steering wheel, and provide the steering torque information of the steering wheel to the steering control module 922.

There may be one or more steering angle sensors 924-2. The steering angle sensor 924-2 may measure the steering angle of the steering wheel, obtain steering angle information of the steering wheel, and provide the steering angle information of the steering wheel to the steering control module 922.

There may be one or more position sensors 924-3. The position sensor 924-3 may measure at least one of the position of the input-side mechanism, the position of the output-side mechanism, and the position of the steering motor, acquire at least one position information of the position information of the input-side mechanism, the position information of the output-side mechanism, and the position information of the steering motor, and provide at least one of the position information of the input-side mechanism, the position information of the output-side mechanism, and the position information of the steering motor to the steering control module 922.

As shown in the drawing, the steering torque sensor 924-1, the steering angle sensor 924-2, and the position sensor 924-3 may be included in the sensor module, but are not limited thereto, and may be included in at least one of the input-side mechanism 911, the output-side mechanism 912, the separation/connection mechanism 913, the steering wheel 914, the wheel 915, the input power source 921, the steering control module 922, and a steering actuator 923 (i.e., steering motor 923-1 and reducer 923-2), respectively, or may be located separately.

Meanwhile, the steering control module 922 may include an electronic control unit (ECU), but is not limited thereto, and may include any control device (or system) that can be controlled electronically.

Meanwhile, the steering actuator 923 may be located on any one of the input-side mechanism 911 and the output-side mechanism 912 to assist the input-side mechanism 911 or the output-side mechanism 912.

For example, in the case that the steering actuator 923 is located on a steering axis of the input-side mechanism 911, the steering system according to the present embodiments may be the C-EPS type. Alternatively, in the case that the steering actuator 923 is located on a rack in the output-side mechanism 912, the steering system according to the present embodiments may be of the R-EPS type. Alternatively, in the case that the steering actuator 923 is located on a pinion of the output-side mechanism 912, the steering system according to the present embodiments may be of P-EPS type.

Referring to FIGS. 1 to 9, a motor 400 illustrated in FIGS. 1 to 8 may be the same component as the steering motor 923-1 of FIG. 9, and a direct current power source illustrated in FIGS. 4 to 7 may be the same component as the input power source of FIG. 9. In addition, the inverter control device 100 including the inverter circuit, failure determiner 110 and controller 120 described in FIGS. 1 to 8 may be included in steering control module 922 of FIG. 9. Accordingly, the steering control module 922 may perform all of the functions of the inverter control device 100 described in FIGS. 1 to 8.

Hereinafter, for simplicity of explanation, overlapping parts will be omitted.

The steering system according to the present embodiments may include a steering motor that assists the steering device; and a steering control module that controls the steering motor. In this case, if a failure occurs in the inverter circuit connected to the steering motor, the steering control module may include a failure determiner for determining whether the failure corresponds to a preset failure type based on the braking torque of the steering motor, and a controller for controlling the switching operation of the inverter circuit to reduce the braking torque of the steering motor based on the failure type if the failure corresponds to the failure type.

If the failure is a failure due to a short circuit of one or both of the upper switching element and the lower switching element of the inverter circuit, the failure determiner may determine that the occurred failure corresponds to a preset failure type.

In particular, the controller may control the switching operation of the inverter to enter a three-phase short-circuit state if the speed of the steering motor is higher than a preset first speed. In this case, the first speed may be a speed at which the braking torque due to a three-phase short-circuit is smaller than the braking torque due to each switching element short circuit.

Here, if the failure is due to a DC-Link short circuit of the inverter circuit, the failure determiner may determine that the failure corresponds to a preset failure type.

In particular, the controller may control the switching operation of the inverter to enter a three-phase short-circuit state if the speed of the steering motor is higher than a preset second speed. In this case, the second speed may be a speed at which the braking torque due to a three-phase short-circuit is smaller than the braking torque due to a DC-link short circuit.

Here, the controller may control the switching operation so that the upper switching element or the lower switching element for each phase of the inverter circuit is turned on simultaneously based on the speed of the steering motor.

In particular, the controller may control the switching operation so that the remaining switching elements located on the same side as the short-circuited switching element are simultaneously turned on based on the short-circuited switching element.

Meanwhile, the steering system may include two steering control modules, and may include a dual winding type steering motor.

Accordingly, the steering system may include a dual winding type steering motor that assists the steering device, and a first steering control module connected to a first winding of the dual winding type steering motor and a second steering control module connected to a second winding of the dual winding type steering motor.

In this case, in a normal state, the steering system may control the dual winding type steering motor through the first steering control module and the second steering control module. That is, the first steering control module and the second steering control module may each control the dual winding type steering motor at a 50% ratio.

In one example, if the first steering control module fails, the dual winding type steering motor may be controlled through the second steering control module connected to the second winding of the dual winding type steering motor.

In another example, if a failure occurs in the inverter circuit of the first steering control module connected to the first winding of the dual winding type steering motor, a failure determiner of the first steering control module may determine whether the failure corresponds to a preset failure type based on the braking torque of the dual winding type steering motor. In addition, if the failure corresponds to a preset failure type, the failure determiner of the first steering control module may control the switching operation of the inverter circuit of the first steering control module to reduce the braking torque of the steering motor based on the failure type. In addition, the dual winding type steering motor can be controlled through the second steering control module connected to the second winding of the dual winding type steering motor.

In another example, if the first steering control module fails, the second steering control module connected to the second winding of the dual winding type steering motor may control the dual winding type steering motor. Then, if a failure occurs in the inverter circuit of the second steering control module connected to the second winding of the dual winding type steering motor, the failure determiner of the second steering control module may determine whether the occurred failure corresponds to a preset failure type on the braking torque of the dual winding type steering motor. In addition, if the failure corresponds to the failure type, the controller of the second steering control module may control the switching operation of the inverter circuit of the second steering control module to reduce the braking torque of the steering motor based on the failure type.

Meanwhile, in the case that the steering system includes a steering device in which the input-side mechanism 911 and the output-side mechanism 912 are electrically connected (i.e., Steer-by-wire type, SbW type), the steering assist device includes two steering assist devices, that is, an input-side steering assist device and an output-side steering assist device.

That is, the input-side steering assist device may assist the input-side mechanism, and the output-side steering assist device may assist the output-side mechanism.

Accordingly, the steering system according to the present embodiments may include an output-side steering motor that assists an output-side mechanism 912 mechanically separated from and electrically connected to an input-side mechanism 911, and an output-side steering control module for controlling the output-side steering motor. The output-side steering control module may include a failure determiner for determining, if a failure occurs in the inverter circuit connected to the output-side steering motor, whether a failure corresponds to a preset failure type based on the braking torque of the output-side steering motor, and a controller that controls the switching operation of the inverter circuit to reduce the braking torque of the output-side steering motor based on the failure type if the failure corresponds to the failure type.

Here, even if the steering system is steer-by-wire type, there may be also applied the embodiments described above in which the steering system includes two steering control modules and includes a dual winding type steering motor.

Figure 10:
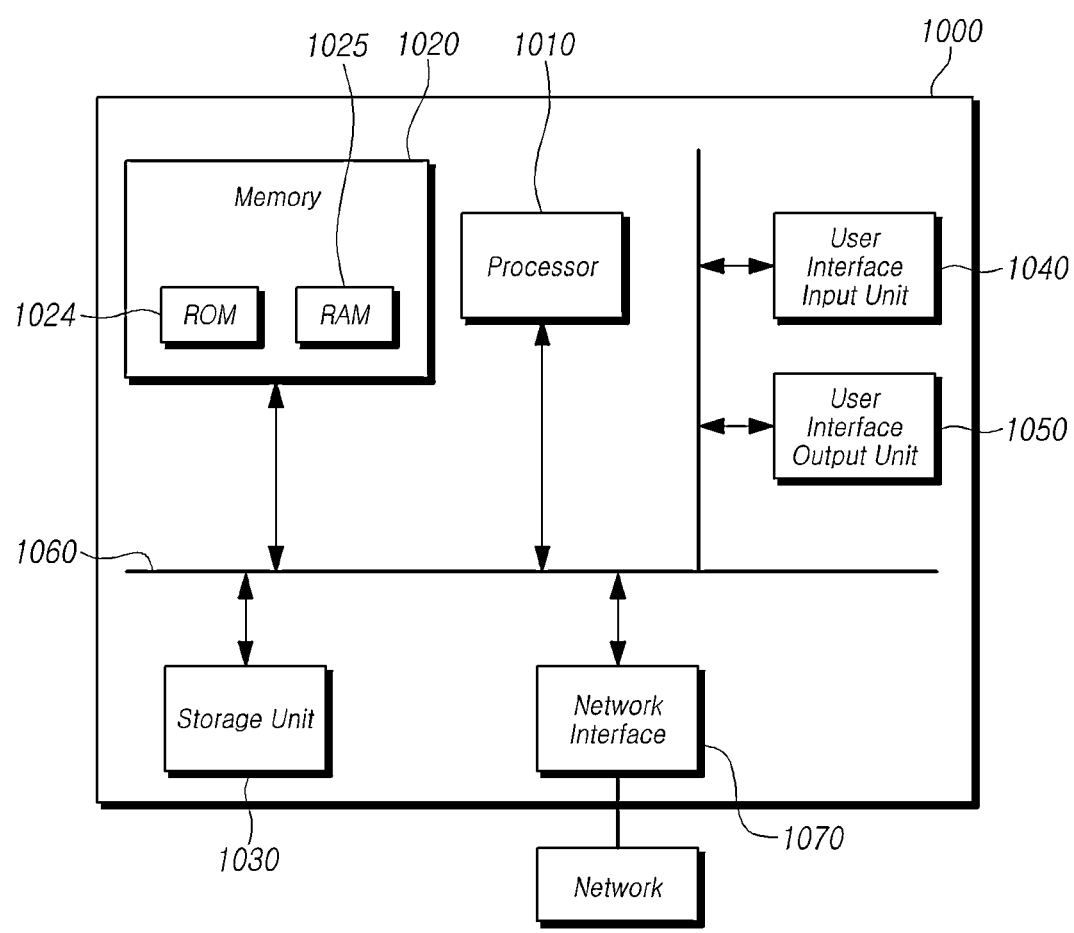
FIG. 10 is a block diagram of a computer system for an inverter control device, a steering control module, a steering assist device, and a steering system according to the present embodiments.

FIG. 10 is a block diagram of a computer system for an inverter control device, a steering control module, a steering assist device, and a steering system according to the present embodiments.

Referring to FIG. 10, the above-described embodiments may be implemented in a computer system, for example, a computer-readable recording medium. As shown in the drawing, a computer system 1000 such as inverter control devices, steering control modules, steering assist devices and steering system may include at least one element of one or more processors 1010, a memory 1020, a storage unit 1030, a user interface input unit 1040, and a user interface output unit 1050. These elements may communicate with each other via the bus 1060. Further, the computer system 1000 may also include a network interface 1070 for connecting to a network. The processor 1010 may be a CPU or a semiconductor device for executing processing instructions stored in the memory 1020 and/or the storage 1030. The memory 1020 and the storage unit 1030 may include various types of volatile/nonvolatile storage media. For example, the memory may include ROM 1024 and RAM 1025.

Accordingly, the present embodiments may be implemented as a computer-implemented method or a nonvolatile computer recording medium having computer-executable instructions stored therein. The instructions, when executed by a processor, may perform the method according to at least one embodiment of the present embodiments. In particular, if there are a plurality of cores, at least one of the plurality of cores may include a lockstep core.

As described above, embodiments of the present disclosure may provide an inverter control device and method capable of reducing the braking torque if a failure of the inverter corresponds to a preset fault type. In particular, it is possible to provides an inverter control device and method and a steering system capable of reducing the driver's load by reducing the braking torque of the motor by controlling the inverter to enter a three-phase short-circuit state in the case that the inverter failure corresponds to a preset failure type.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A device for controlling an inverter comprising:
a failure determiner configured to determine, in response to an occurrence of a failure in an inverter circuit connected to a motor, whether the failure corresponds to a first failure due to a short circuit in one or two among three upper switching elements of three phases of the inverter circuit or a short circuit in one or two among three lower switching elements of three phases of the inverter circuit, or a second failure due to a DC-link short circuit of the inverter circuit based on a braking torque of the motor; and
a controller configured to control, if the failure corresponds to the first failure or the second failure, a switching operation of the inverter circuit so as for all of the three upper switching elements or all of the three lower switching elements to be turned on to enter a three-phase short-circuit state, thereby reducing the braking torque of the motor.

2. The device of claim 1, wherein, in case of the first failure, the controller controls the switching operation of the inverter circuit to turn on remaining switching elements other than one or two short-circuited switching elements in the three upper switching elements or the three lower switching elements.

3. The device of claim 1, wherein the controller controls the switching operation of the inverter circuit to enter the three-phase short-circuit state in the case that a speed of the motor is higher than a first speed,
wherein the first speed is a speed at which a braking torque due to a three-phase short-circuit is smaller than a braking torque due to each switching element short circuit.

4. The device of claim 1, wherein the controller controls the switching operation of the inverter circuit to enter the three-phase short-circuit state in the case that a speed of the motor is higher than a second speed,
wherein the second speed is a speed at which a braking torque due to a three-phase short-circuit is smaller than a braking torque due to the DC-link short circuit.

5. The device of claim 1, wherein the controller controls the switching operation so that the three upper switching elements or the three lower switching elements of the inverter circuit is turned on simultaneously based on a speed of the motor.

6. The device of claim 5, wherein the controller controls the switching operation, based on the one or two short-circuited switching elements, so that the remaining switching elements are turned on simultaneously.

7. A method for controlling an inverter comprising:
determining, in response to an occurrence of a failure in an inverter circuit connected to a motor, whether the failure corresponds to a first failure due to a short circuit in one or two among three upper switching elements of three phases of the inverter circuit or a short circuit in one or two among three lower switching elements of three phases of the inverter circuit, or a second failure due to a DC-link short circuit of the inverter circuit based on a braking torque of the motor; and
controlling, if the failure corresponds to the first failure or the second failure, a switching operation of the inverter circuit so as for all of the three upper switching elements or all of the three lower switching elements to be turned on to enter a three-phase short-circuit state, thereby reducing the braking torque of the motor.

8. The method of claim 7, wherein, in case of the first failure, the controlling comprises controlling the switching operation of the inverter circuit to turn on remaining switching elements other than one or two short-circuited switching elements in the three upper switching elements or the three lower switching elements.

9. The method of claim 7, wherein the controlling comprises controlling the switching operation of the inverter circuit to enter the three-phase short-circuit state in the case that a speed of the motor is higher than a first speed,
wherein the first speed is a speed at which a braking torque due to a three-phase short-circuit is smaller than a braking torque due to each switching element short circuit.

10. The method of claim 7, wherein the controlling comprises controlling the switching operation of the inverter circuit to enter the three-phase short-circuit state in the case that a speed of the motor is higher than a second speed,
wherein the second speed is a speed at which a braking torque due to a three-phase short-circuit is smaller than a braking torque due to the DC-link short circuit.

11. The method of claim 7, wherein the controlling comprises controlling the switching operation so that the three upper switching elements or the three lower switching elements of the inverter circuit is turned on simultaneously based on a speed of the motor.

12. The method of claim 11, wherein the controlling comprises controlling the switching operation, based on the one or two short-circuited switching elements, so that the remaining switching elements are turned on simultaneously.

13. A steering system comprising:
a steering motor for assisting a steering device; and
a steering control module configured to control the steering motor,
wherein the steering control module comprises,
a failure determiner configured to determine, in response to an occurrence of a failure in an inverter circuit connected to the steering motor, whether the failure corresponds to a first failure due to a short circuit in one or two among three upper switching elements of three phases of the inverter circuit or a short circuit in one or two among three lower switching elements of three phases of the inverter circuit, or a second failure due to a DC-link short circuit of the inverter circuit based on a braking torque of the steering motor, and
a controller configured to control, if the failure corresponds to the first failure or a second failure, a switching operation of the inverter circuit so as for all of the three upper switching elements or all of the three lower switching elements to be turned on to enter a three-phase short-circuit state, thereby reducing the braking torque of the steering motor.

14. The steering system of claim 13, wherein, in case of the first failure, the controller controls the switching operation of the inverter circuit to turn on remaining switching elements other than one or two short-circuited switching elements in the three upper switching elements or the three lower switching elements.

15. The steering system of claim 13, wherein the controller controls the switching operation of the inverter circuit to enter the three-phase short-circuit state in the case that a speed of the steering motor is higher than a first speed,
wherein the first speed is a speed at which a braking torque due to a three-phase short-circuit is smaller than a braking torque due to each switching element short circuit.

16. The steering system of claim 13, wherein the controller controls the switching operation of the inverter circuit to enter the three-phase short-circuit state in the case that a speed of the steering motor is higher than a second speed,
wherein the second speed is a speed at which a braking torque due to a three-phase short-circuit is smaller than a braking torque due to the DC-link short circuit.

17. The steering system of claim 14, wherein the controller controls the switching operation so that the three upper switching elements or the three lower switching elements of the inverter circuit is turned on simultaneously based on a speed of the steering motor.

* * * * *